(12) United States Patent
Chitgupakar et al.

(10) Patent No.: US 7,992,139 B2
(45) Date of Patent: Aug. 2, 2011

(54) METHOD, SYSTEM AND PROGRAM PRODUCT FOR TRANSFORMING A SINGLE LANGUAGE PROGRAM INTO MULTIPLE LANGUAGE PROGRAMS

(75) Inventors: Milind Chitgupakar, Omaha, NE (US); Mark S. Ramsey, Kihei, HI (US)

(73) Assignee: International Business Machines Corporation, Armonk, NY (US)

( * ) Notice: Subject to any disclaimer, the term of this patent is extended or adjusted under 35 U.S.C. 154(b) by 1255 days.

(21) Appl. No.: 11/564,658

(22) Filed: Nov. 29, 2006

(65) Prior Publication Data
US 2008/0127127 A1 May 29, 2008

(51) Int. Cl.
G06F 9/45 (2006.01)
(52) U.S. Cl. ........ 717/136; 717/114; 717/137; 717/139; 717/140
(58) Field of Classification Search .......................... None
See application file for complete search history.

(56) References Cited

U.S. PATENT DOCUMENTS

| | | | | |
|---|---|---|---|---|
| 6,006,031 | A * | 12/1999 | Andrews et al. | 717/137 |
| 6,237,136 | B1 * | 5/2001 | Sadahiro | 717/110 |
| 6,425,118 | B1 * | 7/2002 | Molloy et al. | 717/136 |
| 6,738,967 | B1 | 5/2004 | Radigan | |
| 7,024,666 | B1 * | 4/2006 | Brown | 717/137 |
| 7,032,215 | B2 * | 4/2006 | Harrison et al. | 717/140 |
| 7,089,540 | B2 * | 8/2006 | Ogasawara | 717/140 |
| 7,346,897 | B2 * | 3/2008 | Vargas | 717/137 |
| 7,493,602 | B2 * | 2/2009 | Jaeger et al. | 717/137 |
| 7,681,184 | B1 * | 3/2010 | Weedon et al. | 717/137 |
| 2003/0217327 | A1 * | 11/2003 | Ogasawara | 714/798 |
| 2004/0205729 | A1 * | 10/2004 | Iwashita | 717/136 |
| 2005/0050525 | A1 * | 3/2005 | Chittar et al. | 717/136 |
| 2005/0138606 | A1 * | 6/2005 | Basu et al. | 717/136 |
| 2006/0031820 | A1 * | 2/2006 | Li | 717/137 |
| 2006/0041872 | A1 | 2/2006 | Poznanovic et al. | |
| 2006/0271920 | A1 * | 11/2006 | Abouelsaadat | 717/137 |

(Continued)

FOREIGN PATENT DOCUMENTS
WO     WO 01/18649 A2     3/2001

OTHER PUBLICATIONS
Title: An automatic code generation tool for partitioned software in distributed systems, author: Sairaman, V et al, source: IEEE, dated: Jan. 3, 2006.*

(Continued)

Primary Examiner — Chameli C Das
(74) Attorney, Agent, or Firm — John R. Pivnichny; Law Office of Jim Boice (57) ABSTRACT

A method, system and program product for transforming a source code in one language into one or more target modules in one or more languages is provided. The method includes selecting one or more target programming languages suitable for transforming each source module of a source code into one or more target modules written in one or more target programming languages. The method further includes parsing the source code and looking up for a source function in the source code an equivalent target function in a target programming language, such that execution of the equivalent target function in the target programming language is optimized. The method further includes writing out in the target programming language the equivalent target function corresponding to the source function, such that each source module is transformed into one or more target modules whose execution in the one or more target programming languages is optimized.

22 Claims, 3 Drawing Sheets

U.S. PATENT DOCUMENTS

| | | | |
|---|---|---|---|
| 2007/0006182 A1* | 1/2007 | Goyal et al. | 717/136 |
| 2007/0055966 A1* | 3/2007 | Waddington et al. | 717/144 |
| 2007/0074186 A1* | 3/2007 | Muthukumar et al. | 717/140 |
| 2007/0271553 A1* | 11/2007 | Higgins et al. | 717/136 |
| 2008/0115118 A1* | 5/2008 | Bartucca et al. | 717/140 |
| 2008/0216060 A1* | 9/2008 | Vargas | 717/137 |

OTHER PUBLICATIONS

Title: Towards Translating Authorizations for Transformed XML documents, author: Chatvichienchai, S et al, source: IEEE, dated: Dec. 12, 2002.*

* cited by examiner

METHOD, SYSTEM AND PROGRAM PRODUCT FOR TRANSFORMING A SINGLE LANGUAGE PROGRAM INTO MULTIPLE LANGUAGE PROGRAMS

FIELD OF THE INVENTION

The present invention relates to the field of programming systems and, more particularly, the invention relates to a method, system and computer program product for transforming a single language program written in a single programming language into multiple programs written in multiple languages, such that execution of the multiple programs is optimized in the multiple language environments.

BACKGROUND OF THE INVENTION

Current application development environments consist of a programming language which is parsed and compiled into executable code or parsed and executed within an interpretive environment. In recent years, significant features have been made available within a computer infrastructure's software. To maximize the performance and scalability available within the computer infrastructure software requires that application programs be re-written or sub-divided based on the functionality required. Invariably, such modifications can be complex, time consuming and labor intensive. As such, there is a need for an efficient way to maximize the performance and scalability offered within a computer infrastructure without having to re-write or sub-divide application programs.

SUMMARY OF THE INVENTION

In a first aspect of the invention, there is provided a method for transforming a source code written in a source programming language into one or more target modules written in one or more target programming languages. The method comprises parsing a source code written in a source programming language. In an embodiment, the source code has one or more source modules. The method further comprises selecting one or more target programming languages suitable for transforming the one or more source modules of the source code into one or more target modules, looking up for a source function in the source code an equivalent target function in a target programming language of the one or more target programming languages selected, such that execution of the equivalent target function in the target programming language is optimized. The method further comprises writing out in the target programming language of the one or more target programming languages selected the equivalent target function corresponding to the source function, such that each of the one or more source modules of the source code is transformed into the one or more target modules whose execution in the one or more target programming languages is optimized. The method further comprises launching execution of each of the one or more target modules in the one or more target programming languages. In an embodiment, the parsing step further comprises reading each line of the source code written in the source programming language, and parsing each line of the source code into the one or more source functions. In an embodiment, the looking up step further comprises providing a target conversion table for transforming each of the one or more source functions of the source code into one or more target functions in the one or more target programming languages selected. Further, the looking up step comprises looking up the source function of the source code in the target conversion table in order to transform the source function of the source code into the equivalent target function. In an embodiment, the writing step further comprises writing out the one or more target modules in the one or more target programming languages. In an embodiment, the source programming language is different than each of the one or more target programming languages selected.

In another aspect of the invention, there is provided a system for transforming a source program written in a source programming language into one or more target modules written in one or more target programming languages. The system includes a source program written in a single source programming language, the source program having one or more source modules. The system further includes a function conversion table configured to provide a respective target function corresponding to a respective source function in each of one or more pre-determined target programming languages. Further, the system includes a transformation component configured to parse each line of the source program and to transform, using the function conversion table, each line of the source code into one or more target functions in the one or more pre-determined target programming languages, such that each of the one or more source modules is transformed into one or more target modules whose execution in the one or more pre-determined target programming languages is optimized. In an embodiment, the transformation component is further configured to read configuration data providing input as to how many pre-determined target programming languages the source code will be transformed into. In an embodiment, the transformation component is further configured to read each line of the source code and to parse each line of the source code into one or more source functions. In an embodiment, the transformation component is further configured to determine for a source function of the one or more source functions in the source code a target programming language of the one or more pre-determined target programming languages into which the source function will be transformed, such that the source function is transformed into an equivalent target function whose execution is optimized in the target programming language. In an embodiment, the transformation component is further configured to look up in the function conversion table the equivalent target function corresponding to the source function in the source code to be transformed in the target programming language. In an embodiment, the transformation component is further configured to launch execution of the one or more target modules in the one or more pre-determined target programming languages. In an embodiment, the source programming language is different than each of the one or more pre-determined target programming languages selected.

In yet another aspect of the invention, there is provided a computer program product for transforming a single source program in a source programming language into one or more target modules in one or more target programming languages. The computer program product includes a computer readable medium, first program instructions to parse a single source program in a source programming language, the single source program having one or more source modules. The computer program product includes second program instructions to provide a function conversion table for transforming a source function of the source program into an equivalent target function in each of one or more pre-selected target programming languages. The computer program product includes third program instructions to transform, using the function conversion table, each source function of the source code into a respective target function in a respective target programming language of the one or more pre-selected target programming languages, wherein execution of the respective target function in the respective target programming language is optimized, and wherein the first, second and third program instructions are stored on the computer readable medium. The computer program product further includes fourth program instructions to determine the one or more pre-selected target programming languages to be used for transforming the single source program, the fourth program instructions being stored on the computer readable medium. In an embodiment, the first program instructions include instructions to read each line of the source program and to parse each line of the source program into the one or more source functions. In an embodiment, the third program instructions include instructions to select for the source function the respective programming language of the one or more pre-selected target programming languages for transforming the source function into the respective target function in the respective target programming language. Further, in an embodiment, the third program instructions include instructions to look up in the function conversion table the respective target function in the respective target programming language corresponding to the source function to be transformed, and to write out the respective target function in the respective target programming language. In an embodiment, the source programming language is different than each of the one or more pre-determined target programming languages selected.

Further, in yet another aspect of the invention, there is provided a process for deploying computing infrastructure includes integrating computer-readable code into a computing system, wherein the code in combination with the computing system is capable of performing a process for transforming a source program in a source programming language into one or more target modules in one or more target programming languages. The process includes parsing a source program written in a source programming language, the source program having one or more source modules, and determining one or more target programming languages to be used for transforming the one or more source modules in the source program into one or more target modules in the one or more target programming languages. The process further includes looking up in a function conversion table each of one or more source functions in the source program for transforming a respective source function of the one or more source functions into a respective target function in a target programming language selected from the one or more target programming languages and writing out one or more target functions in the one or more target programming languages for each of the source modules, the one or more target functions corresponding to the one or more source functions in each of the source modules, wherein each of the one or more source modules is transformed into one or more target modules in the one or more target programming languages. The process further includes launching execution of the one or more target modules in the one or more target programming languages, wherein execution of the one or more target modules in the one or more target programming languages is optimized. In an embodiment, the parsing step further includes reading each line of the source program, and parsing each line of the source program into the one or more source functions. In an embodiment, the looking step further includes selecting the respective target programming language for transforming the respective source function into the respective target function, and looking up in the function conversion table the respective source function in the respective target programming language for transforming the respective source function into the respective target function in the respective target programming language. In an embodiment, the source programming language is different than each of the one or more target programming languages.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the invention provides a method for transforming a source code written in a source programming language into one or more target modules written in one or more target programming languages. The method comprises parsing a source code written in a source programming language. In an embodiment, the source code has one or more source modules. The method further comprises selecting one or more target programming languages suitable for transforming the one or more source modules of the source code into one or more target modules, looking up for a source function in the source code an equivalent target function in a target programming language of the one or more target programming languages selected, such that execution of the equivalent target function in the target programming language is optimized. The method further comprises writing out in the target programming language of the one or more target programming languages selected the equivalent target function corresponding to the source function, such that each of the one or more source modules of the source code is transformed into the one or more target modules whose execution in the one or more target programming languages is optimized. The method further comprises launching execution of each of the one or more target modules in the one or more target programming languages. In an embodiment, the parsing step further comprises reading each line of the source code written in the source programming language, and parsing each line of the source code into the one or more source functions. In an embodiment, the looking up step further comprises providing a target conversion table for transforming each of the one or more source functions of the source code into one or more target functions written in the one or more target programming languages selected. Further, the looking up step comprises looking up the source function of the source code in the target conversion table in order to transform the source function of the source code into the equivalent target function. In an embodiment, the writing step further comprises writing out the one or more target modules in the one or more target programming languages. In an embodiment, the source programming language is different than each of the one or more target programming languages selected.

Figure 1:
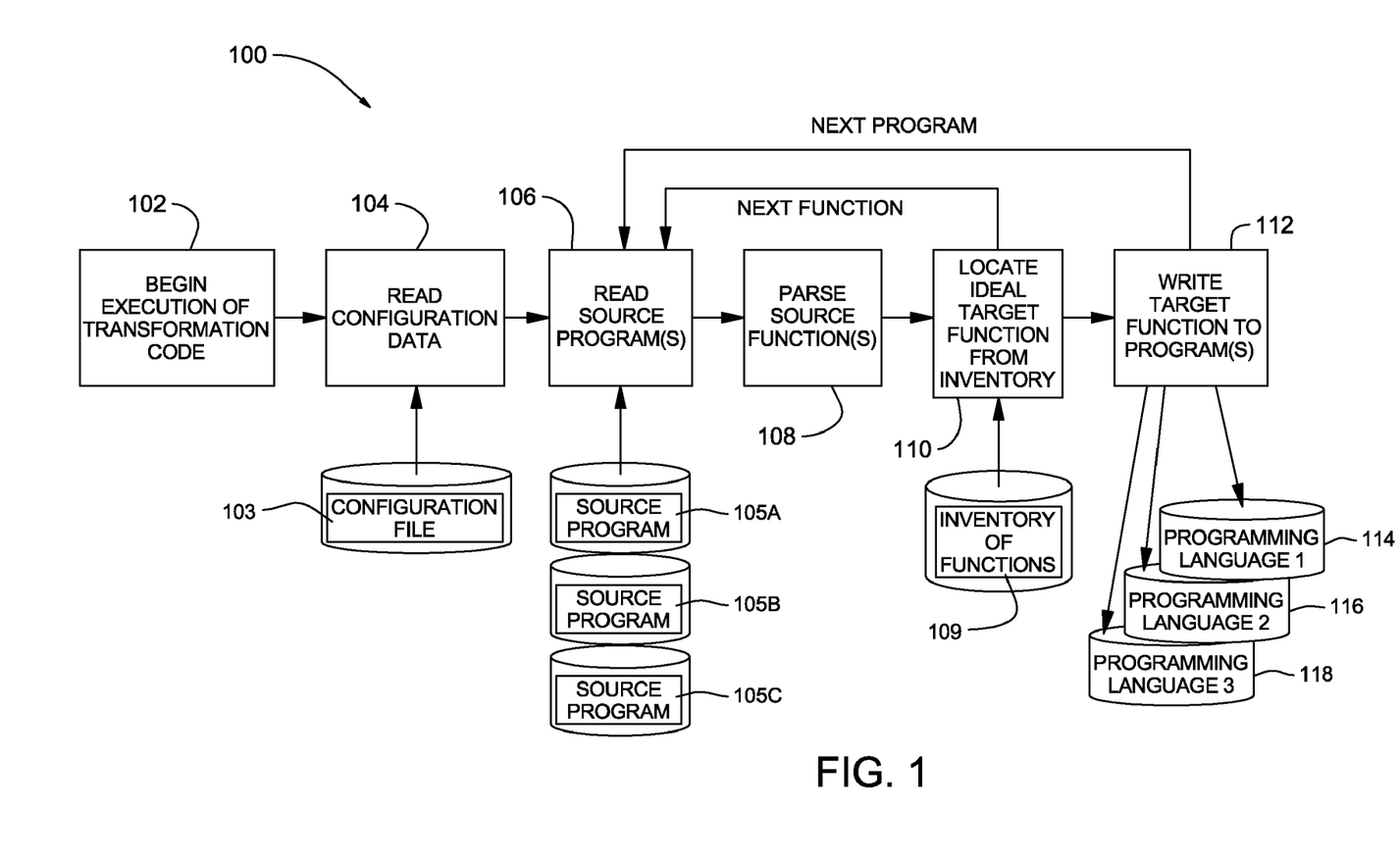
FIG. 1 depicts a flowchart which outlines the steps involved in transforming a single source code into a plurality of target modules in one or more target programming languages, in accordance with an embodiment of the present invention.

Reference is now made to FIG. 1, which outlines the method steps involved in transforming a single source code into a plurality of target modules in one or more target programming languages, in accordance with an embodiment of the invention. Turning to FIG. 1, reference numeral 100, outlines the steps involved in transforming a single source code into a plurality of target modules in one or more target programming languages. The method starts in step 102 with starting execution of the transformation code for transforming a single language source program or code. In step 104, the transformation code reads or gathers configuration data stored in a configuration file 103 in order to transform the source program. In particular, the configuration file 103 provides input data, such as, which programming language to use for the source code and which target programming languages to use for transforming the source code into one or more target modules. For instance, the source code may be written in the Rexx programming language whereas, the target programming languages that the source code is to be transformed into may be a program module using the C programming language and another program module using the DB2 SQL programming language. The configuration file 103 also provides platform information for the target programming languages. For instance, the platform for the C program module may be an AIX platform, whereas, the platform for the SQL program module may be a UNIX or mainframe platform. Further, the configuration file 103 also provides location information for the source code, the location information where the target modules or programs will be stored as well as the location information for the function conversion table that is to be used for converting a function in the source code into an equivalent target function in a target programming language, such that execution of the target function in the target programming language is optimized. Further, in step 106, the transformation code reads a first source program, for instance, source program 105A of the source code stored in a storage system, such as, a database system. The transformation code parses the source program 105A. In particular, the source program includes one or more source modules. As such, the transformation code parses each line of a source module of the source program into one or more source functions. The transformation code locates or looks up in step 110 an ideal or equivalent target function from an inventory of functions, often referred to herein as a function conversion table or conversion table 109, which contains an inventory of all source functions in a source code or program in a given programming language. The function conversion table 109 provides an ideal or equivalent target function in a target programming language that corresponds to the source function, and whose execution in the programming language will be optimized. The transformation code locates or looks up in step 110 an equivalent target function for each of the source functions parsed in step 108. After the transformation code has located an equivalent target function for each source function in each of the source modules of the source program 105A, the transformation code writes in step 112 the equivalent target function in a target programming language that will provide optimized execution of the target function. The transformation code converts or transforms each source function by writing out an equivalent or ideal target function in a target programming language in which execution of the target function will be optimized. The transformation code will determine the optimal target function/code for a given source function based on the setting in the configuration file and based on the available inventory of target functions. For instance, if the configuration file 103 sets forth that the source code or program is to be transformed using three different programming languages, then a source function may be written as a target function in any one of three target programming languages, such as, programming language 1, reference numeral 114 or in programming language 2, reference numeral 116 or programming language 3, reference numeral 118, depending on which programming language will provide optimized execution of the target function transformed from the source function. As such, each source module in the source program 105A written in a single source programming language may be transformed into one or more target modules written in each of the three programming languages 114, 116 and 118 or in one programming language or even two programming languages chosen from the set of three programming languages 114, 116 or 118. Once the transformation code has transformed and written out the target functions corresponding to the source functions in the source program 105A, the transformation code reads the next source program, namely, source program 105B. The steps 108 through 112 are repeated as described herein above. Similarly, if there are more source programs to be transformed, then the transformation code reads the next source program, for instance, source program 105C and repeats steps 108 through 112 until all the source programs have been transformed.

Accordingly, as mentioned herein above a source program may consist of one or more source modules. In an embodiment, each source module gets transformed into one or more target modules. As each line of the source module is read, it is parsed into one or more source functions. Then based on the configuration data, each source function is transformed into a target function by doing a lookup in the inventory of functions. The transformation code will then select a replacement target function in a target programming language from the inventory of functions to be used based on the configuration data. The inventory of functions is a list or table of source to target mappings based on the source programming language and the target programming languages to be used. The transformation code then writes out one or more target modules in one or more target programming languages. In a simple case, if the source program is written in SAS and the target programming language to be used is C, for each supported SAS function, there would be an entry in the inventory with the corresponding C function. For example, if the SAS function is Foo=SUM(a,b) then the transformed version in C may be Foo=a+b. Similarly, if the selection as set forth in the configuration file is to transform a source program written in SAS into target modules written in C and DB2 SQL, then each source function is converted based on the priority of the function in the inventory table. For instance, functions that are more efficient in SQL, would be transformed into SQL and other functions that are more efficient in C would be transformed into C. In an embodiment, the target modules would typically stay together with the functions being called for one or more target programming languages. The master or main programming language selected would allow functions to run in other languages. For example, the main program might be C, with calls to SQL and PMML that are driven into the database.

Another example is of a source code written in the SAS programming language that is to be converted into the DB2 SQL programming language and the C programming language. For example, the SAS programming language has a function named MAX that fetches the largest number in a given set of numeric variables, for instance, VAR1, VAR2, VAR3. The SAS code for this function may be:

"MAX_VAR=MAX(VAR1, VAR2, VAR3);"

then the SAS source function would be looked up in the inventory of functions or the function conversion table depending on the configuration data obtained from the configuration file and converted into the DB2 SQL function:

"CASE WHEN VAR1 > (CASE WHEN VAR2 > VAR3
    THEN VAR2
    ELSE VAR3
    END)
    THEN VAR1
    ELSE (CASE WHEN VAR2 > VAR3
        THEN VAR2
        ELSE VAR3
    END)
END AS MAX_VAR;".

Further, the SAS source function MAX would be looked up in the inventory of functions or function conversion table, again, using the configuration data in the configuration file and converted into the C function:

"MAX_VAR=MAX(VAR1, MAX(VAR2, VAR3));".

In another embodiment, the invention provides a system for transforming a source program written in a source programming language into one or more target modules written in one or more target programming languages. The system includes a source program written in a single source programming language, the source program having one or more source modules. The system further includes a function conversion table configured to provide a respective target function corresponding to a respective source function in each of one or more pre-determined target programming languages. Further, the system includes a transformation component configured to parse each line of the source program and to transform, using the function conversion table, each line of the source code into one or more target functions in the one or more pre-determined target programming languages, such that each of the one or more source modules is transformed into one or more target modules whose execution in the one or more pre-determined target programming languages is optimized. In an embodiment, the transformation component is further configured to read configuration data providing input as to how many pre-determined target programming languages the source code will be transformed into. In an embodiment, the transformation component is further configured to read each line of the source code and to parse each line of the source code into one or more source functions. In an embodiment, the transformation component is further configured to determine for a source function of the one or more source functions in the source code a target programming language of the one or more pre-determined target programming languages into which the source function will be transformed, such that the source function is transformed into an equivalent target function whose execution is optimized in the target programming language. In an embodiment, the transformation component is further configured to look up in the function conversion table the equivalent target function corresponding to the source function in the source code to be transformed in the target programming language. In an embodiment, the transformation component is further configured to launch execution of the one or more target modules in the one or more pre-determined target programming languages. In an embodiment, the source programming language is different than each of the one or more pre-determined target programming languages selected.

Figure 2:
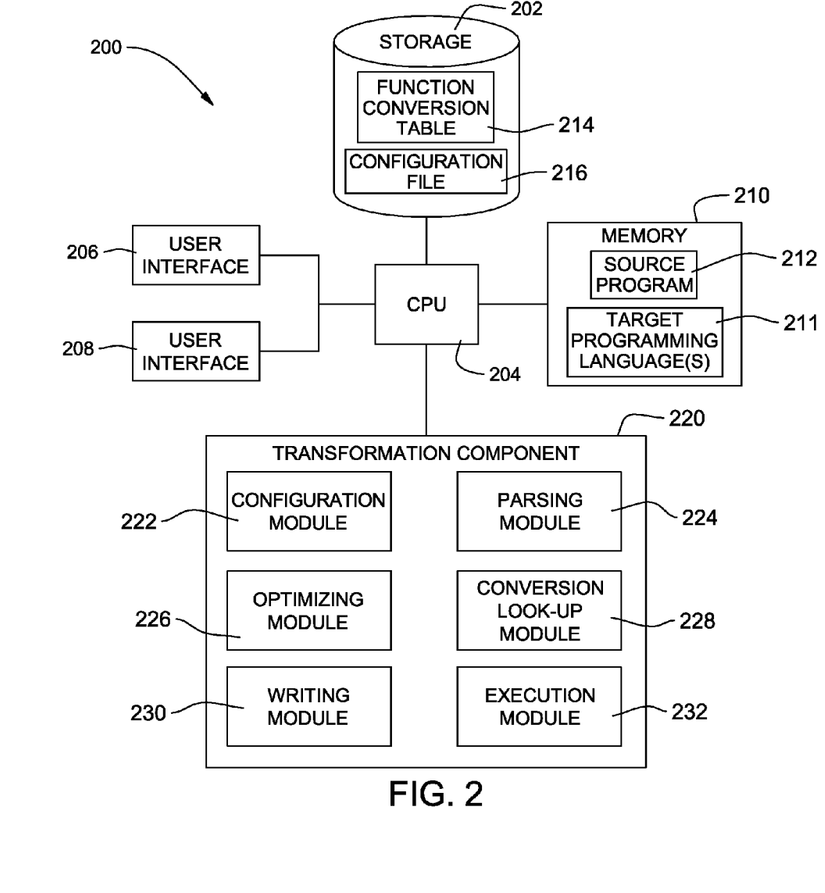
FIG. 2 is a schematic block system diagram illustrating an embodiment of a system for transforming a single source code into a plurality of target modules in one or more target programming languages, in accordance with an embodiment of the present invention.

Reference is now made to FIG. 2, which illustrates an embodiment of a system for transforming a source code written in a source programming language into one or more target modules written in one or more target programming languages. Turning to FIG. 2, FIG. 2 is a schematic block system diagram illustrating one embodiment of a system or server 200 having a transformation code or component 220 deployed thereon, the transformation code or component 220 being configured to transform a source code written in a source programming language into one or more target modules written in one or more target programming languages, in accordance with an embodiment of the invention. Preferably, the system 200 is a server that includes a central processing unit (CPU) 204, a local storage device 202, a user interface 206, a network interface 208, and a memory 210. The CPU 204 is configured generally to execute operations within the system/server 200. The user interface 206, in one embodiment, is configured to allow a user or programmer to interact with the system 200, including allowing input data and commands from a user and communicating output data to the user. The network interface 208 is configured, in one embodiment, to facilitate network communications of the system 200 over a communications channel of a network (not shown in any of the drawings). In an embodiment, the local memory 210 is configured to store a source program 212 or several source programs 212 to be transformed. In addition, the memory 210 is configured to store one or more target programming language(s) 211 to be used to transform a source code into one or more target modules whose execution is optimized in the target programming languages that the target modules are written in. Alternatively, the source program 212 may be stored in storage 202. Further, in an embodiment, a function conversion table 214, which contains a source function in a source programming language and equivalent target functions in different target programming languages, is stored in storage system 202. Furthermore, in an embodiment, the configuration file 216, which contains data with respect to the one or more target programming languages to be used to transform the source code, as well as respective platforms, location of the source code and data as to where to store any target modules created, is stored in storage 202.

In one embodiment, as shown in FIG. 2, the transformation code or component 220 which runs on the server or system 200 comprises a logic unit that contains a plurality of modules configured to functionally execute the necessary steps of transforming a source code written in a source programming language into one or more target modules written in one or more target programming languages. In particular, the transformation code or component 220 includes a configuration module 222, a parsing module 224, an optimizing module 226, a function conversion look-up module 228, a writing module 230 and an execution module 232. The configuration module 222 of the transformation code or component 220 is configured to refer to a configuration file to read data regarding the source program or code programming language and the one or more types of target programming languages that are to be used for transforming the source code. Further, the configuration module 222 is configured to find the location of the source code, and to determine one or more locations where the target modules will be stored. Also, the configuration module 222 is further configured to gather platform information that the different target programming languages will be utilizing. The parsing module 224 is configured to read a source module of the source code or program and to parse each line of the source module into one or more source functions. Further, the optimizing module 226 is configured to determine or select for each source function the ideal target programming language to be used to convert or transform the source function into an equivalent target function, such that execution of the target function in the target programming language will be optimized. Furthermore, the conversion look-up module 228 is configured to look-up the equivalent target function in the target programming language that is optimal for executing the target function. Moreover, the writing module 230 is configured to write out the equivalent target function for a source function in the target programming language selected to be optimal for executing the target function. Additionally, the execution module 232 is configured to execute the transformed target function in the target programming language selected.

In yet another embodiment, the invention provides a computer program product for transforming a single source program in a source programming language into one or more target modules in one or more target programming languages. The computer program product comprises a computer readable or computer-usable medium, which provides program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. Preferably, the computer storage medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. Further, preferably, network medium can comprise of transmission devices on a network, such as, cables, routers, switches and/or network adapter cards.

The computer program product further comprises first program instructions to parse a single source program in a source programming language, the single source program having one or more source modules. The computer program product further comprises second program instructions to provide a function conversion table for transforming a source function of the source program into an equivalent target function in each of one or more pre-selected target programming languages. The computer program product comprises third program instructions to transform, using the function conversion table, each source function of the source code into a respective target function in a respective target programming language of the one or more pre-selected target programming languages, such that execution of the respective target function in the respective target programming language is optimized. The computer program product further comprises fourth program instructions to determine the one or more pre-selected target programming languages to be used for transforming the single source program, the fourth program instructions being stored on the computer readable medium. In an embodiment, the first program instructions include instructions to read each line of the source program and to parse each line of the source program into the one or more source functions. In an embodiment, the third program instructions include instructions to select for the source function the respective programming language of the one or more pre-selected target programming languages for transforming the source function into the respective target function in the respective target programming language. Further, in an embodiment, the third program instructions include instructions to look up in the function conversion table the respective target function in the respective target programming language corresponding to the source function to be transformed, and to write out the respective target function in the respective target programming language. In an embodiment, the source programming language is different than each of the one or more pre-determined target programming languages selected. Preferably, each of the first, second, third and fourth program instructions are stored on the computer readable medium.

Figure 3:
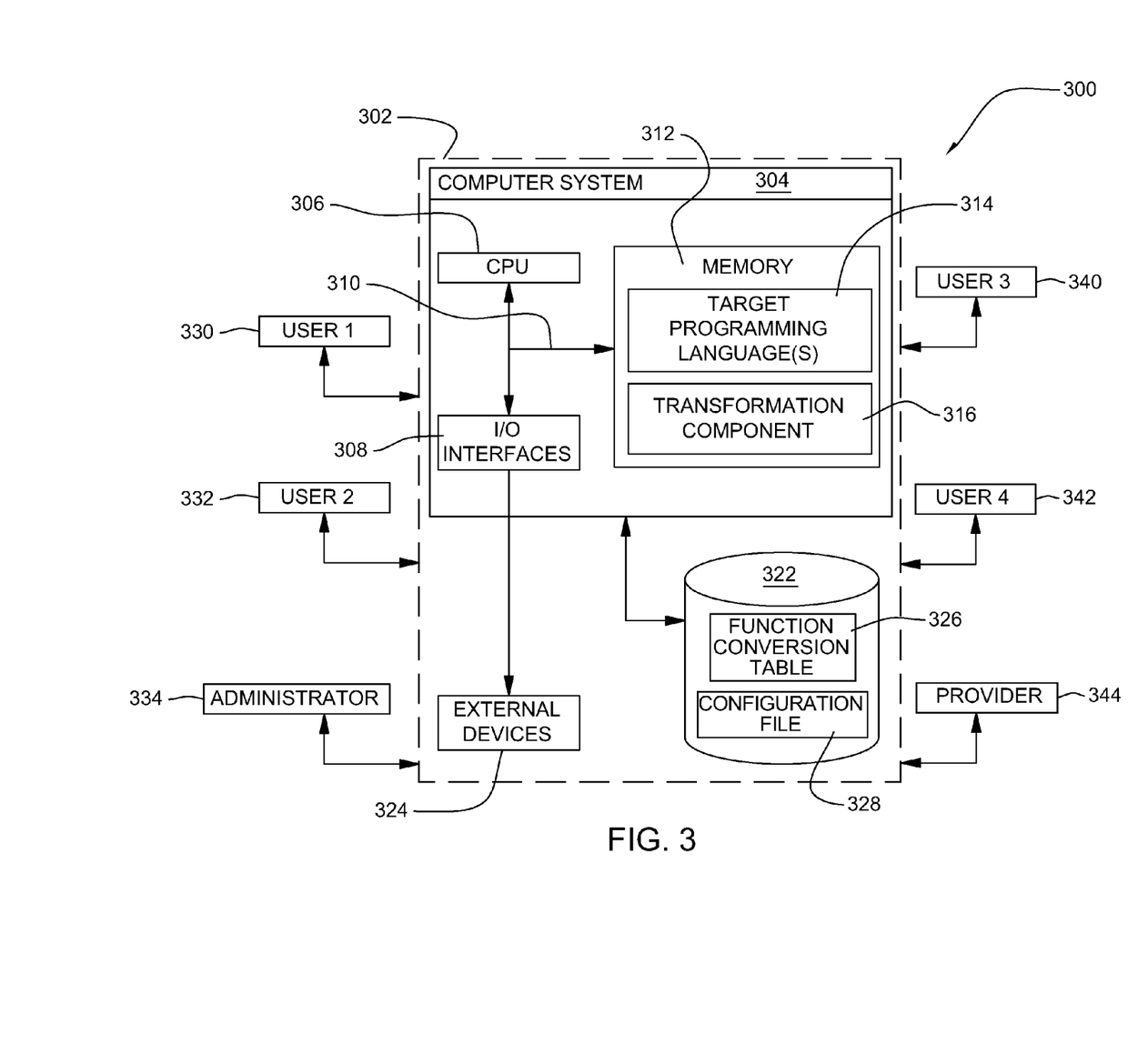
FIG. 3 is a schematic block system diagram illustrating an embodiment of a computer infrastructure for transforming a single source code into a plurality of target modules in one or more target programming languages, in accordance with an embodiment of the invention.

Referring now to FIG. 3, there is illustrated a system 300 for transforming a single source program in a source programming language into one or more target modules in one or more target programming languages, in accordance with an embodiment of the present invention. As depicted, system 300 includes a computer infrastructure 302, which is intended to represent any type of computer architecture that is maintained in a secure environment (i.e., for which access control is enforced). As shown, infrastructure 302 includes a computer system 304 that typically represents a server 304 or the like configured to transform a single source program in a source programming language into one or more target modules in one or more target programming languages that is accessed by a user or programmer at a client (e.g., a personal computer, a laptop, a handheld device, etc), for instance, user A 330. It should be understood, however, that although not shown, other hardware and software components (e.g., additional computer systems, routers, firewalls, etc.) could be included in infrastructure 302.

In general, a programmer or user (for instance, user 1, reference numeral 330) at a client is connected via a network to infrastructure 302, which includes a transformation code or component 316 that is configured to transform a single source program in a source programming language into one or more target modules in one or more target programming languages. Similarly, one or more users, such as user 2, reference numeral 332 and/or user 3, reference numeral 340 and/or user 4, reference numeral 342 can interface with infrastructure 302, which is configured to transform a single source program in a source programming language into one or more target modules in one or more target programming languages. To this extent, infrastructure 302 provides a secure environment. In particular, a user or programmer accesses the server or system 304 over a network via interfaces (e.g., web browsers) loaded on the client, for example, a personal computer, a laptop, a handheld device, etc. In the case of the latter, the network can be any type of network such as the Internet, a local area network (LAN), a wide area network (WAN), a virtual private network (VPN), etc. In any event, communication with infrastructure 302 could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the parties could utilize an Internet service provider to establish connectivity to infrastructure 302. It should be understood that under the present invention, infrastructure 302 could be owned and/or operated by a party such as provider 344, or by an independent entity. Regardless, use of infrastructure 302 and the teachings described herein could be offered to the parties on a subscription or fee-basis. In either scenario, an administrator 334 could support and configure infrastructure 302.

The server 304 is shown to include a CPU (hereinafter "processing unit 306"), a memory 312, a bus 310, and input/output (I/O) interfaces 308. Further, the server 304 is shown in communication with external I/O devices/resources 324 and storage system 322. In general, processing unit 306 executes computer program code, such as the transformation code or component 316, which reads in a source program that a user wants to transform. Further, in an embodiment, the memory includes one or more target programming languages to be used for transforming a source program. While executing computer program code, the processing unit 306 executes the transformation code or component 316 to read and/or write data, to/from memory 312, storage system 322, and/or I/O interfaces 308. For instance, in one embodiment, the function conversion table 326, which the transformation component 316 uses to transform the single source program 314 written in a source programming language into one or more target modules written in one or more target programming languages, is stored in storage 322 and can be accessed by the server 304. Similarly, the configuration file 328, which contains data such as what target programming languages to use to transform the source code, the location where the source code is stored, and the location of where to store the one or more target modules created in the transformation process. Alternatively, the function conversion table 326 and/or the configuration file 328 could be stored in a separate storage within the infrastructure 302. Bus 310 provides a communication link between each of the components in computer system 300, such that information can be communicated within the infrastructure 302. External devices 324 can comprise any devices (e.g., keyboard, pointing device, display, etc.) that enable a user to interact with computer system 300 and/or any devices (e.g., network card, modem, etc.) that enable server 304 to communicate with one or more other computing devices.

Computer infrastructure 302 is only illustrative of various types of computer infrastructures for implementing the invention. For example, in one embodiment, computer infrastructure 302 comprises two or more computing devices (e.g., a server cluster) that communicate over a network to perform the various process steps of the invention. Moreover, computer system 300 is only representative of various possible computer systems that can include numerous combinations of hardware. To this extent, in other embodiments, computer system 300 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 306 may comprise a single processing unit, or be distributed across one or more processing units in one or more locations, e.g., on a client and server. Similarly, memory 312 and/or storage system 322 can comprise any combination of various types of data storage and/or transmission media that reside at one or more physical locations. Further, I/O interfaces 308 can comprise any system for exchanging information with one or more external devices 324. Still further, it is understood that one or more additional components (e.g., system software, math co-processing unit, etc.) not shown in FIG. 3 can be included in computer system 300. However, if computer system 300 comprises a handheld device or the like, it is understood that one or more external devices 324 (e.g., a display) and/or storage system(s) 322 could be contained within computer system 304, and not externally as shown.

Storage system 322 can be any type of system (e.g., a database) capable of providing storage for information under the present invention. To this extent, storage system 322 could include one or more storage devices, such as a magnetic disk drive or an optical disk drive. In another embodiment, storage system 322 includes data distributed across, for example, a local area network (LAN), wide area network (WAN) or a storage area network (SAN) (not shown). Although not shown, additional components, such as cache memory, communication systems, system software, etc., may be incorporated into computer system 300.

Further, in yet another embodiment, the invention provides a process for deploying computing infrastructure comprises integrating computer-readable code into a computing system, wherein the code in combination with the computing system is capable of performing a process for transforming a source program in a source programming language into one or more target modules in one or more target programming languages. The process comprises parsing a source program written in a source programming language, the source program having one or more source modules, and determining one or more target programming languages to be used for transforming the one or more source modules in the source program into one or more target modules in the one or more target programming languages. The process further comprises looking up in a function conversion table each of one or more source functions in the source program for transforming a respective source function of the one or more source functions into a respective target function in a target programming language selected from the one or more target programming languages and writing out one or more target functions in the one or more target programming languages for each of the source modules, the one or more target functions corresponding to the one or more source functions in each of the source modules, wherein each of the one or more source modules is transformed into one or more target modules in the one or more target programming languages. The process further comprises launching execution of the one or more target modules in the one or more target programming languages, wherein execution of the one or more target modules in the one or more target programming languages is optimized. In an embodiment, the parsing step further comprises reading each line of the source program, and parsing each line of the source program into the one or more source functions. In an embodiment, the looking step further comprises selecting the respective target programming language for transforming the respective source function into the respective target function, and looking up in the function conversion table the respective source function in the respective target programming language for transforming the respective source function into the respective target function in the respective target programming language. In an embodiment, the source programming language is different than each of the one or more target programming languages.

Accordingly, any of the components of the present invention as shown in FIG. 3 can be deployed, managed, serviced by a service provider 344 who offers to transform a single source program written in a source programming language into one or more target modules written in one or more target programming languages, such that execution of the one or more target modules written in the target programming languages is optimized. Preferably, the invention provides a business method that performs the process steps of the invention on a subscription, advertising and/or fee basis. In particular, a service provider 344 (shown in FIG. 3), such as a solution integrator could offer to transform a single source program written in a source programming language into one or more target modules written in one or more target programming languages in order to optimize execution of the one or more target modules. In this case, the service provider can, for instance, create, maintain, and support a computer infrastructure that performs the process steps of the invention for one or more customers. In return, the service provider can receive payment from the customer or customers under a subscription and/or fee agreement and/or the service provider can receive payment from the sale or advertising of content to one or more third parties.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer implemented method of transforming a source code written in a source programming language into multiple target modules written in multiple different target programming languages, said computer implemented method comprising the steps of:

parsing a source code written in a source programming language into multiple source modules;

selecting multiple target programming languages suitable for transforming each of said multiple source modules of said source code into multiple target modules, wherein all of the multiple target programming languages are different from one another;

a processor looking up, for a source function of each of said multiple source modules, an equivalent target function that is performed using a target programming language from selected said multiple target programming languages;

the processor transforming each of said multiple source modules into multiple target modules that all perform said equivalent target function of said source function, wherein each of the multiple target modules is written in a different language selected from the multiple target programming languages; and the processor ranking said multiple target modules transformed from each of the multiple source modules according to their relative efficiencies, wherein a highest ranked target module is more efficient than other ranked target modules derived from said each of the multiple source modules.

2. The computer implemented method according to claim 1, further comprising:

matching the highest ranked target module with an appropriate compiler; and the processor launching execution of the highest ranked target module by using the appropriate compiler.

3. The computer implemented method according to claim 1, wherein said parsing further comprises:

reading each line of said source code written in said source programming language; and parsing said each line of said source code into one or more source functions.

4. The computer implemented method according to claim 3, wherein said looking up further comprises:

providing a target conversion table for use in said transforming by matching said source function with said equivalent target function found in said target conversion table.

5. The computer implemented method according to claim 4, wherein said looking up further comprises:

looking up said source function of said source code in said target conversion table in order to transform said source function of said source code into said equivalent target function.

6. The computer implemented method according to claim 5, wherein said writing further comprises:
writing out said multiple target modules in said multiple target programming languages.

7. The computer implemented method according to claim 6, wherein said source programming language is different from each of said multiple target programming languages selected.

8. A system for transforming a source program written in a source programming language into multiple target modules written in different target programming languages, the system comprising:
a processor;
a source program written in a source programming language, said source program having one or more source modules;
a function conversion table configured to provide a respective target function corresponding to a respective source function in each of multiple pre-determined target programming languages; and
a transformation component configured to parse each module of said source program and to transform, using said function conversion table, said each module of said source code into multiple target functions in said multiple pre-determined target programming languages, wherein each of said one or more source modules is transformed into multiple target modules whose execution in said multiple pre-determined target programming languages is optimized, and wherein said transformation component is further configured to rank said multiple target modules transformed from each of the multiple source modules according to their relative efficiencies, wherein a highest ranked target module is more efficient than other ranked target modules derived from said each of the multiple source modules; and wherein the transformation component comprises software executed on the processor.

9. The system according to claim 8, wherein said transformation component is further configured to read configuration data providing input as to how many multiple pre-determined target programming languages said source code will be transformed into.

10. The system according to claim 8, wherein said transformation component is further configured to match the highest ranked target module with an appropriate compiler.

11. The system according to claim 10, wherein said transformation component is further configured to launch execution of the highest ranked target module by using the appropriate compiler.

12. The system according to claim 11, wherein said transformation component is further configured to:
read each line of said source code written in said source programming language; and
parse said each line of said source code into said one or more source functions.

13. The system according to claim 12, wherein said source programming language is different from any of said multiple pre-determined target programming languages selected.

14. A computer program product for transforming a single source program in a source programming language into multiple target modules in multiple different target programming languages, said computer program product comprising:
a non-transitory computer readable storage medium;
first program instructions to parse a source code written in a source programming language into multiple source modules;
second program instructions to select multiple target programming languages suitable for transforming each of said multiple source modules of said source code into multiple target modules, wherein all of the multiple target programming languages are different from one another;
third program instructions to look up, for a source function of each of said multiple source modules, an equivalent target function that is performed using a target programming language from selected said multiple target programming languages;
fourth program instructions to transform each of said multiple source modules into multiple target modules that all perform said equivalent target function of said source function, wherein each of the multiple target modules is written in a different language selected from the multiple target programming languages, and wherein said transforming is performed by matching said source function with said equivalent target function found in a conversion table;
fifth program instructions to rank said multiple target modules transformed from each of the multiple source modules according to their relative efficiencies, wherein a highest ranked target module is more efficient than other ranked target modules derived from said each of the multiple source modules;
and wherein said first, second, third, fourth, and fifth program instructions are stored on said non-transitory computer readable storage medium.

15. The computer program product according to claim 14, further comprising:
sixth program instructions to match the highest ranked target module with an appropriate compiler; and
wherein said sixth program instructions are stored on said non-transitory computer readable storage medium.

16. The computer program product according to claim 15, further comprising:
seventh program instructions to launch execution of the highest ranked target module by using the appropriate compiler;
and wherein said seventh program instructions are stored on said non-transitory computer readable storage medium.

17. The computer program product according to claim 16, further comprising:
eighth program instructions to read each line of said source code written in said source programming language; and
ninth program instructions to parse said each line of said source code into said one or more source functions;
and wherein said eighth and ninth program instructions are stored on said non-transitory computer readable storage medium.

18. The computer program product according to claim 17, further comprising:
tenth program instructions to provide a target conversion table for transforming each of said one or more source functions of said source code into one or more target functions written in said one or more target programming languages selected;
eleventh program instructions to look up said source function of said source code in said target conversion table in order to transform said source function of said source code into said equivalent target function;

and wherein said tenth and eleventh program instructions are stored on said non-transitory computer readable storage medium.

19. A process for deploying computing infrastructure comprising integrating computer-readable code into a computing system, wherein said code in combination with said computing system is capable of performing a process for transforming a source program in a source programming language into multiple target modules in multiple target programming languages, said process comprising:

parsing a source code written in a source programming language into multiple source modules;

determining multiple target programming languages to be used for transforming said one or more source modules in said source program into multiple target modules in said multiple target programming languages;

a processor looking up in a function conversion table each of one or more source functions in said source program for transforming a respective source function of said one or more source functions into a respective target function in a respective target programming language selected from said multiple target programming languages;

the processor writing out a corresponding target function in each of said multiple target programming languages for each of said source modules, said multiple target functions corresponding to each source function in said each of said one or more source modules, wherein each of said one or more source modules is transformed into multiple target modules in said multiple target programming languages;

the processor ranking said multiple target modules transformed from each of the multiple source modules according to their relative efficiencies, wherein a highest ranked target module is more efficient than other ranked target modules derived from said each of the multiple source modules; and the processor launching execution of one of said multiple target modules in said multiple target programming languages.

20. The process according to claim 19, wherein said parsing further comprises:

reading each line of said source program; and parsing said each line of said source program into said one or more source functions.

21. The process according to claim 20, wherein said looking further comprises:

selecting said respective target programming language for transforming said respective source function into said respective target function; and looking up in said function conversion table said respective source function in said respective target programming language for transforming said respective source function into said respective target function in said respective target programming language.

22. The process according to claim 21, wherein said source programming language is different from each of said multiple target programming languages.

* * * * *